United States Patent [19]

Brisson et al.

[11] Patent Number: 5,132,246
[45] Date of Patent: Jul. 21, 1992

[54] PROCESS FOR USING DROSS RESIDUES TO PRODUCE REFRACTORY PRODUCTS

[75] Inventors: Clément Brisson, Chicoutimi; Gaétan Chauvette, Rivière des Prairies; Frank M. Kimmerle, Jonquière; Roger Roussel, Chicoutimi, all of Canada

[73] Assignee: Alcan International Limited, Montreal, Canada

[21] Appl. No.: 468,253

[22] Filed: Jan. 22, 1990

[51] Int. Cl.⁵ .................. C04B 35/02; C04B 35/10; C04B 35/58; C04B 35/62
[52] U.S. Cl. .................................. 501/96; 501/94; 501/98; 501/108; 501/155; 75/10.19; 75/10.21
[58] Field of Search ............... 501/94, 96, 98, 108, 501/155, 123; 75/10.19, 10.21

[56] References Cited

U.S. PATENT DOCUMENTS

| | | |
|---|---|---|
| 4,636,374 | 1/1987 | Kurihara et al. |
| 4,952,237 | 8/1990 | Dube et al. .......... 75/10.19 |
| 4,959,100 | 9/1990 | Dube et al. .......... 75/10.19 |
| 4,960,460 | 10/1990 | Dube et al. .......... 75/10.19 |
| 4,985,382 | 1/1991 | Nadkarni et al. ........ 501/155 |

OTHER PUBLICATIONS

Gillespie—CIM Bulletin of Jan. 1948 "The Manufacture of Mineral Wool".
Nafziger et al—CIM Bulletin of Aug. 1976 "ELECTRIC FURNACE MELTING OF BY-PRODUCT METALLURGICAL SLAGS".
Vaillancourt—Le Quebec Industriel—May 1988—pp. 32, 33 "CAFCO FAIT PROGRESSER L'USAGE DU FOUR A ROC ELECTRIQUE".
Vaillancourt—Le Quebec Industriel—May 1988—pp. 32, 33 "CAFCO FAIT PROGRESSER L'USAGE DU FOUR A ROC ELECTRIQUE".

*Primary Examiner*—William R. Dixon, Jr.
*Assistant Examiner*—Michael A. Marcheschi
*Attorney, Agent, or Firm*—Cooper & Dunham

[57] ABSTRACT

A process for using nitride-containing aluminum dross residues to produce refractory products. The process involves mixing a dross residue which contains AlN, without prior conversion of the aluminum nitride in the dross to aluminum oxide or hydroxide, with a material comprising a metal oxide or a metal oxide precursor, and calcining the resulting mixture at a temperature suitable to produce a refractory product. During the calcination step, the AlN reacts with other components of the mixture. Since the reaction is exothermic, less heat is required for the calcination step than if a dross residue containing no AlN were used. The AlN can also reduce various contaminants (e.g. $Fe_2O_3$, silicon and titanium) present in the metal oxide refractories, and so the invention can be used to produce conventional refractory products of improved purity and appearance. The process enables dross residues to be used for useful purposes rather than being discarded.

21 Claims, No Drawings

PROCESS FOR USING DROSS RESIDUES TO PRODUCE REFRACTORY PRODUCTS

BACKGROUND OF THE INVENTION

I. Field of the Invention

This invention relates to a process for using dross residues to produce refractory products.

II. Description of the Prior Art

Dross is a material which forms on the surface of molten aluminum or aluminum alloys during remelting and metal holding and handling operations when the molten metal is in contact with a reactive atmosphere. Dross normally consists of metal oxides and nitrides and a considerable quantity of molten free (unreacted) metal. For economic reasons, it is normally desirable to extract the free metal for re-use, but afterwards the remaining dross (dross residue) has in the past been dumped in land fill sites since it has had no economic value.

The dumping of dross residues in this manner has recently come to be regarded as environmentally unacceptable because harmful chemicals may leach out of the dross into the water table and thus cause widespread pollution.

Part of the problem caused by dross residues results from the presence of soluble salts in the residues as a consequence of the traditional process for removing the free metal. This process involves heating and tumbling the dross in the presence of a molten salt bath in order to remelt the metallic fraction and to cause the resulting small molten metal droplets to coalesce and form an easily separable molten metal pool. While the process is quite efficient in extracting the metal, the residual salt cake forms a large proportion of the dross residue.

We have previously devised a process for extracting the free metal component from dross without the use of molten salt baths. This process is disclosed in our Canadian patent number 1,255,914 issued on Jun. 20, 1989 (the disclosure of which is incorporated herein by reference) and involves the treatment of dross in a furnace heated by means of a plasma torch. This heating procedure can be carried out on the dross without any prior treatments and results in the coalescence of molten metal droplets in the dross in the absence of molten salts.

While our improved process of treating dross avoids the environmental problems caused by the salt content of dross treated in the traditional way, the resulting "plasma dross" residue still contains appreciable amounts of aluminum nitride and may therefore still be unsuitable for disposal in land-fill sites since this chemical may also be a pollutant.

There is therefore a need for a process of disposing of dross which does not result in environmental problems and yet can be operated economically. Proposals have been made in the past to convert dross into useful products, such as refractories, with the intention of not only avoiding disposal problems but also of bringing in an economic return, but these proposals have not been put into widescale use because various problems have been encountered.

The use of dross residues to produce ceramics is discussed in an article entitled "Refractory Products Obtained Using Aluminum Rich Recovered Raw Materials" by R. Dal Maschio et. al. in Ceramics Developments, 34-36 (1988), pp. 735-739. The article investigates the formation of alumina-rich or spinel-based refractories by calcining dross either alone or following the addition of magnesium carbonate. In those cases where magnesium carbonate was employed, the dross was first calcined in air at about 800° C., mixed with magnesite and then fired at temperatures of 300°-600° C. In those cases where the dross was used alone the material was first heated at 800° or 1200° C. before being fired. The preliminary heating or calcination step is necessary to convert the various compounds in the dross, particularly aluminum nitride, to the corresponding oxides and to smelt and evaporate some of the sodium chloride content. It was deduced from the tests that the dross needs a lengthy stay (some hours) at temperatures higher than 1200° C. to reach a complete oxidation and a stable weight. A conclusion was reached that, in spite of a high impurity content, the calcined material could be used alone or mixed with magnesite for the production of refractory chammottes.

The problem with this conventional procedure is that it requires the preliminary calcination step and this is both time consuming and expensive in terms of energy. It is therefore believed that the process will not be put into widescale use.

Accordingly, there is still a need for a process for converting dross to useful products on a commercially viable scale and it is an object of the present invention to satisfy this need.

SUMMARY OF THE INVENTION

According to one aspect of the present invention, there is provided a process for producing a refractory product, which process comprises mixing an aluminum dross residue containing aluminum nitride, without prior conversion of said aluminum nitride in the residue to aluminum oxide or hydroxide, with a material selected from the group consisting of a metal oxide and a metal oxide precursor, and calcining the resulting mixture at a temperature suitable for the production of a refractory product.

The refractory products produced by the present invention are capable of resisting chemical and physical decomposition when exposed to high temperature.

According to another aspect of the present invention, there is provided a process for improving the purity of an impure refractory product containing an impurity, which process comprises mixing an aluminum dross residue containing aluminum nitride, without prior conversion of said aluminum nitride in the residue to aluminum oxide or hydroxide, with said impure refractory product, and heating the resulting mixture at a temperature suitable for the removal of a substantial amount of said impurity.

DETAILED DESCRIPTION OF THE INVENTION

The dross residues used in the present invention contain a proportion of aluminum nitride as well as other metal compounds, principally oxides. Instead of converting the aluminum nitride content of the dross to other compounds such as alumina or aluminum hydroxide, as was thought necessary in the past, the nitride content is employed without conversion in the process of the invention. Rather than being detrimental to the intended reactions, the nitride content is beneficial because it is not only capable of direct reaction with the other reactants or impurities, but it also generates a greater heat of reaction than aluminum oxide so that the reactions can proceed more quickly at lower temperatures. In other words, the need to convert the nitride is eliminated and the reaction of the dross residue is more effective and efficient.

The nitride content of dross residues arises from the reactions which take place during the metal melting and handling operations which result in the formation of the dross. In the past, it was often assumed that dross residue consisted mainly of oxides, but we have found that the nitride content is higher than expected when the dross is kept away from moisture and highly oxidizing environments, e.g oxygen or air at elevated temperature. In general, in order to obtain the desirable effects of the present invention, the dross residues should have an aluminum nitride content of at least 5% by weight, more preferably at least 10% by weight and generally about 25% by weight (±10%).

Dross residues from a rotary salt furnace are generally not suitable for use in the present invention. If salt furnace dross residue is first treated with water to remove the salt content, the water usually hydrolyses the AlN to aluminum hydroxide and thus avoids the advantages derived the present invention. On the other hand, if salt furnace dross residue is used in the present invention without prior removal of the salt content, the calcination or heating step results in the unacceptable generation of environmentally hazardous salt fumes containing chlorides and alkalis. Nevertheless, if these problems could be overcome, i.e. if a dross residue containing AlN without salt could be obtained from salt furnace dross residue, then this dross residue would be suitable for use in the invention.

Except for salt dross residues, residues from most other processes can be used in the present invention, for example dross residues resulting from the electric arc treatment of dross or residues resulting from the treatment described in U.S. Pat. No. 3,999,980 issued on Dec. 28, 1976 to Dominic Montagna. These residues contain suitable quantities of AlN without large quantities of salt. It is, however, particularly advantageous to use dross residues from our plasma process referred to above since dross from this process generally has a high proportion of AlN (typically about 25% by weight) without significant amounts of volatiles or pollutants.

PRODUCTION OF REFRACTORY PRODUCTS

As indicated above, to produce refractory products, the dross residue containing the AlN is mixed with a metal oxide or a metal oxide precursor (i.e. a compound such as a metal carbonate that is converted to a metal oxide during the calcination step) without any prior separate treatment to convert the nitride to an oxide or other compound. The metal oxide is normally used in the form of a relatively fine powder having a particle size similar to that of the dross residue (often about 3 inch diameter pieces) and a quite thorough mixing is usually carried out, e.g. employing a simple mechanical mixer. However, thorough mixing may not be necessary in all cases, for example if the calcination step is to be carried out at a temperature high enough to melt the solids. In such cases, the dross residue and added oxide or precursor become thoroughly mixed when melting takes place. It is also possible to mix the oxide or precursor with dross prior to the removal of aluminum metal. Dross treatment processes usually involve agitation of the dross charge and this distributes the added oxide or precursor throughout the charge so that further mixing is unnecessary after the removal of molten Al from the dross. In such cases, it will be appreciated that when reference is made to the addition of oxide or precursor to "dross residue", this term includes dross itself prior to treatment for the removal of the metal content of the dross.

If the addition of the oxide or precursor is to be carried out after the removal of the molten metal from the dross, it may be convenient to use the dross treatment furnace for the mixing step. For example, in the case of plasma dross treatment in a rotary furnace, the oxide or precursor may be added to the rotary furnace after the removal of the molten Al and the rotation of the furnace continued. The same furnace may also be used for the calcination of the resulting mixture.

In most cases, it is desirable to mix the dross residue with the oxide or precursor before the calcination step is commenced. However, it may be desirable in some cases to mix the dross residue to a heated quantity of the oxide or precursor, or vice versa. For example, if the nitride in the dross generates so much heat as it reacts that the reaction may become uncontrollable, it may be advisable to feed the dross residue slowly to a heated quantity of the oxide to limit the rate of heat generation.

The metal oxide or the precursor thereof to be mixed with the dross residue can be any material which is capable of producing a refractory product with the dross residue and the ratio of the dross residue and the oxide or precursor can be chosen to produce the desired product. For example, the metal oxide may be magnesium oxide used in an amount suitable for the production of magnesium spinel [MgO].[Al$_2$O$_3$], or silica used in an amount suitable for the formation of mullite [Al$_2$O$_3$].[SiO$_2$]. Other suitable oxides include CaO, NiO, TiO$_2$, borates and the like, and their precursors such as calcium silicate. Moreover, complex oxides may also be employed, e.g. metal oxides in combination with aluminum oxide, such as aluminosilicates.

It should be mentioned that it is not necessarily the intention to produce refractory products of precisely stoichiometrical composition, but rather to produce commercial grade refractories that may only approximate recognised mixed metal oxide refractories.

The process involves the calcination (i.e. heating in a gaseous atmosphere) of the mixture at a high temperature suitable to produce a new mineral phase (at least in part) and an advantage of the invention is that this temperature can be lower than that used in techniques ascribed to others. This is believed to be because, once a certain threshold temperature is reached, the reaction of the AlN becomes autocatalytic and exothermic, and the heat generated by this reaction reduces the heat necessary to bring about the overall calcination of the refractory materials. The precise temperature of the calcination is difficult to specify in any particular case. It not only depends on the particular materials employed, but the measured temperatures in large scale processes are usually temperatures at the external wall of the furnace. Since the refractory material is somewhat insulating, the temperature reached within the mass of material is probably higher. Once the nitride in the mixture begins to react, it is not unusual to experience an increase in temperature of 200° C. inside the mass of material within about 30 seconds. In any event, it is expected that the heat required to raise refractory powders to sintering temperatures (for example) when employing the present invention are likely to be equivalent to the heat that would produce temperatures about 200°–300° C. lower if a similar mixture containing no nitrides were heated in a similar way, although this depends on many variable factors.

The actual calcination temperature to be achieved depends on the nature of the product to be obtained. If a sintered product is desired, the calcination temperature should be in the range of 1000°-700° C., or more usually 1100°-1500° C. For complete melting, temperatures up to about 2300° C. may be required. The range of 1000°-2300° C. thus covers most of the intended reactions.

The calcination step is normally carried out under oxygen, air or other oxygen-containing gas at normal atmospheric pressures. However, other reactive gases (e.g. nitrogen) may be used instead in order to change the composition of the final product. It is also possible to carry out the reaction under an inert gas, e.g. argon. For example, so-called "sialons" (compounds of silicon, aluminum, oxygen and nitrogen) can be formed when silica is added to the dross and the calcination is carried out under an inert gas. The nitrogen content of the sialon product comes from the nitride content of the dross residue. It is found that AlN contributes a heat of reaction in these cases as well as in the cases employing oxygen.

The calcination step should be carried out for a period of time necessary to produce the required result. The reaction time depends on the size of the vessel, the quantity of the charge and whether sintering or melting is required. Calcination times often range from 1 to 24 hours.

Following the calcination step, the product can be treated in various ways. For example, a sintered product can be allowed to cool and can then be ground to a particle size suitable for use as a refractory precursor. Such products would later be converted to green bodies and fired. Refractory melts, on the other hand, can be cast or converted to fibres or the like.

The formation of spinel, mullite and other products is explained in more detail below to further illustrate the invention.

Spinel

Plasma dross residues contain aluminum nitride and also a proportion of other materials such as non-stoichiometrical spinel $[MgO]_{1-x}[Al_2O_3]_{(1+x)}$ (wherein x is usually in the range of 0-0.3), and corundum ($\alpha$-$Al_2O_3$). A typical plasma dross composition is 30% AlN, 35% $Al_2O_3$ and 30% $MgO.Al_2O_3$ (the balance being other metal oxides).

When it is intended to convert the dross residue to magnesium spinel, a suitable amount of MgO (or precursor) is added. The aluminum nitride reacts in the presence of air or oxygen to form spinel or a solid solution thereof:

$$(1-X)MgO + 2(1+X)AlN + 3/2(1+X)O_2 \rightarrow [MgO]_{1-x}[Al_2O_3]_{(1+x)} + (1+X)N_2 \uparrow$$

where x usually same the as above

Nevertheless, upon heating, part of the aluminum nitride content of the residue will be oxidized directly to alumina:

$$2 AlN + 3/2\ O_2 \rightarrow Al_2O_3 + N_2 \uparrow$$

If moisture is present, some of the aluminum nitride will also react to form aluminum hydrate and ammonia:

$$AlN + 3H_2O \rightarrow Al(OH)_3 + NH_3 \uparrow$$

Upon calcination, any hydrate formed will be converted to alumina, and the alumina thus produced, as well as that produced by the oxidation of AlN and any alumina that may have been originally present, will be converted to spinel upon reaction with MgO:

$$(1-x)MgO + (1+x)Al_2O_3 \rightarrow [MgO]_{(1-x)}[Al_2O_3]_{(1+x)}$$

wherein x is usually the same as above.

The calcination step is carried out in air or oxygen at a temperature of 1500° C. or higher. The reaction can be carried out at atmospheric pressure and normally requires a reaction time of 0.5 to 2 hours, depending on the temperature employed.

The reaction product, after cooling, can be used as it is as a refractory powder but further treatment and purification can be carried out if desired, for example, the spinel in the reaction product can be subjected to hydrolysis in concentrated caustic solution to yield a spinel of high purity.

Similar procedures can be used to form other types of spinels, e.g. celonite and pleonaste $(Mg.Fe)Al_2O_4$, chlorspinel $Mg(Al.Fe)_2O_4$ and other nonstoichiometric compounds by adding oxides other than MgO.

Magnesium spinel is, however, the product normally preferred because it has the advantage that it does not react with molten metals such as Al, a high resistance to thermal fatigue, excellent resistivity to alkali attack and high stability.

The process outlined above is particularly advantageous for the production of spinels because the starting material, dross residue, is extremely inexpensive and the treatment steps are also simple and relatively inexpensive. The product is therefore much less expensive than spinel produced in the conventional way, i.e by fusing alumina and magnesia together.

Mullite and Sialon

Instead of adding MgO or precursors to the dross to produce spinel, silica or precursors can be added to produce mullite $3Al_2O_3.2SiO_2$, which is also a useful refractory material.

Silica from various sources can be used. In particular, clay minerals and hydrous silicates lose chemically combined water at elevated temperatures. At this point, the clays have lost crystallinity and they are in a state where reaction with other materials will proceed more rapidly.

Fuller's and diatomaceous earths act as suitable sources of aluminosilicates and silica while the dross supplies aluminum oxide, aluminum nitride and aluminum hydroxide.

The reaction proceeds as follows:

$$x(Al_2O_3.ySiO_2) + z(Al_2O_3) \longrightarrow 3\ Al_2O_3.2SiO_2$$
(mullite)

wherein y is usually 0.1-2 and x and z vary according to the value of y.

A particularly desirable source of silica and alumino silicates is spent filter cake from rolling oil filters, from which part of the oil has previously been removed (e.g. by solvent extraction). This filter cake contains Fuller's and diatomaceous earths (50/50 w/w).

Other suitable sources of silica for use in the present invention include silica fumes and Georgia clay. In this case, the reaction proceeds as follows:

(1) silica fumes

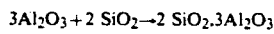

$$3Al_2O_3 + 2 SiO_2 \rightarrow 2 SiO_2.3Al_2O_3$$

(2) Georgia clay $$2SiO_2.Al_2O_3 + 2Al_2O_3 \rightarrow 2SiO_2.3Al_2O_3$$

The reaction is carried out at at least 1100° C., preferably at least 1200° C. and optimally at about 1500° C.

Mullite is a high thermal resistance crystalline phase that plays a significant role in the refractory industry. The product of the process of the invention is mainly mullite with a small amount of magnesium spinel.

If the reaction is carried out under nitrogen instead of in air or oxygen, an aluminum silicon oxide nitride (sialon) is formed instead of mullite:

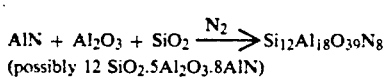

$$AlN + Al_2O_3 + SiO_2 \xrightarrow{N_2} Si_{12}Al_{18}O_{30}N_8$$
(possibly 12 SiO$_2$.5Al$_2$O$_3$.8AlN)

The method can be extended to produce other types of sialon with the addition of sources of Li, Mg, Be and Ca.

PURIFICATION OF REFRACTORY PRODUCTS

In the above description, the emphasis has been placed on the conversion of the dross residue into a refractory product by the addition of an oxide or a precursor. However, the invention can be applied equally well to the improvement of a refractory product such that the product is converted to a more valuable form, generally a more pure form. This is achieved by the addition of nitride-containing dross residue to the product followed by calcination.

This aspect of the invention is based on the fact that nitride-containing dross has the ability to reduce certain impurities found in oxide based refractories, e.g. in refractories used to form ceramic fibres, mineral wool fibres, ceramic abrasives and the like, such as slag and scurries. Refractories of this type often contain silica and iron as impurities and it is usual to mix the refractories with iron oxide (hematite or rust from iron scrap) and carbon (usually coke) and then to heat the mixture to high temperature in order to reduce the iron oxide to form molten iron, which then dissolves the silicon to form a molten ferrosilicon alloy. The molten refractory product floats on the alloy and the two can be separated by tapping off the product at the appropriate level. When dross residue containing aluminum nitride is used, there is no need to add the carbon because the nitride acts as the reducing agent and the same ferrosilicon alloy is formed. The dross residue also adds alumina to the product, which is normally desirable because it usually increases the melting point of the product. As with the conventional process, it may be necessary to add iron oxide, depending on the content of iron and silicon in the impure refractory product.

In the same way, it is possible to remove titanium as well as silicon. For example, calcined bauxite contains both silicon and titanium, and a lowering of the content of these metals can be achieved by the present invention. Although calcined bauxite normally contains iron oxide (the composition is generally 95% alumina, 1–2% Si, 1–2% Ti and 2–3% Fe), additional iron oxide normally has to be added to ensure that all of the reduced silicon and titanium can be dissolved in the molten metal.

The amount of nitride-containing dross residue added to the refractory containing a reducible impurity depends on the content of the impurity to be removed. Generally, however, the amount falls within the range of 2–10% (preferably 2–3%) by weight of the refractory product. The required treatment temperature depends on the refractory material being treated because different materials have different melting points and melting is usually necessary to achieve the desired purification effect. In the case of mineral wool, the treatment temperature can be as low as 1350° C., but for abrasives of higher alumina content the treatment temperature is normally about 2300° C. Treatment times are normally a few hours.

The invention is illustrated in further detail by the following non-limiting Examples.

EXAMPLE 1—MAGNESIUM SPINEL

Dross residue from a plasma treatment was mixed with MgO in the weight ratio 100:31 and reacted at a temperature of 1300° C. for 1.5 hours in air.

The product was analyzed by X-ray diffraction which showed that it is essentially $MgAl_2O_4$.

The product had a particle size of 2–5 microns.

EXAMPLE 2—MULLITE

Oil from spent filter cake residue from a rolling oil filter was extracted with benzene. The residue (a mixture of diatomaceous earth and Fuller's earth) was mixed in the weight ratio of 1:1 with the dross residue remaining after the removal of Al from dross by a plasma treatment.

The resulting mixture was fired in air at 1500° C. for a period of 24 hours.

X-Ray diffraction carried out in the product showed the formation of mullite (maj ) and corrundum (med.).

EXAMPLE 3-MULLITE

Powdered clay from Preston and dross recovered after the removal of Al by plasma treatment were mixed together in the weight ratio of 1:1 and reacted at 1400° C. in air for 1.5 hours in a crucible.

The product sintered into the shape of the crucible. X-Ray diffraction showed that the product was mainly mullite (maj.), $Al_2O_3$ (med.) and $MgO.Al_2O_3$ (med.).

What we claim is:

1. A process for producing a refractory product, which process comprises:

mixing an aluminum dross residue containing aluminum nitride, without prior conversion of said aluminum nitride in the residue to aluminum oxide or hydroxide, with a material selected from the group consisting of magnesium oxide, silicon oxide, calcium oxide, nickel oxide, titanium oxide and precursors thereof; and calcining the resulting mixture at a temperature in the range of about 1000° C. to 2300° C. suitable for the production of a refractory product.

2. A process according to claim 1 wherein said dross residue contains at least 5% by weight of said aluminum nitride.

3. A process according to claim 1 wherein said dross residue contains at least 10% by weight of said aluminum nitride.

4. A process according to claim 1 wherein said dross residue contains 25±10% by weight of said nitride.

5. A process according to claim 1 wherein said material is selected from mixed metal oxides.

6. A process according to claim 1, wherein said dross residue is a residue from a plasma dross treatment procedure.

7. A process according to claim 1 wherein said calcination is carried out in an oxygen-containing gas.

8. A process according to claim 7 wherein said oxygen containing gas is air.

9. A process according to claim 1 wherein said calcination is carried out in an inert gas.

10. A process according to claim 1 wherein said material is magnesium oxide or a precursor and said material is mixed with an amount of said dross residue to produce magnesium spinel.

11. A process according to claim 1 wherein said material is silica or a precursor and said material is mixed with an amount of said dross residue to produce mullite.

12. A process according to claim 1 wherein said material is silica or a precursor and wherein said calcination is carried out under an inert gas to produce sialon.

13. A process according to claim 1 wherein said temperature is a temperature at which said refractory product sinters.

14. A process according to claim 1 wherein said temperature is a temperature at which said refractory product melts.

15. A process for improving the purity of an impure refractory product containing an impurity, which process comprises mixing an aluminum dross residue containing aluminum nitride, without prior conversion of said aluminum nitride in the residue to aluminum oxide or hydroxide, with said impure refractory product, and heating the resulting mixture at a temperature in the range of about 1000° to 2300° C. suitable for the removal of an amount of said impurity.

16. A process according to claim 15 wherein said impurity is a reducible material capable of being reduced by said aluminum nitride to produce a reduced material and wherein said reduced material is separated from said refractory product following said heating step.

17. A process according to claim 16 wherein, during said heating step, a further material is present which alloys with said reduced material and said alloy separates from said refractory material.

18. A process according to claim 17 wherein said further material is iron.

19. A process according to claim 18 wherein said iron is produced by the reduction of iron oxide during said heating step.

20. A process according to claim 18 wherein said impurity is silicon and iron oxide is added to the refractory product in addition to said dross residue to permit the formation of a ferrosilicon alloy.

21. A process according to claim 18 wherein said impurity is titanium and iron oxide is added to the refractory product in addition to said dross residue to permit the formation of a ferrotitanium alloy.

* * * * *